US011472285B2

(12) United States Patent
Togo et al.

(10) Patent No.: US 11,472,285 B2
(45) Date of Patent: Oct. 18, 2022

(54) DRIVE DEVICE FOR PTO SHAFT OF WORKING MACHINE

(71) Applicant: KUBOTA CORPORATION, Osaka (JP)

(72) Inventors: Manabu Togo, Osaka (JP); Hiroshi Miyake, Osaka (JP); Ryuji Kataoka, Osaka (JP); Tsuyoshi Gono, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 345 days.

(21) Appl. No.: 16/819,449

(22) Filed: Mar. 16, 2020

(65) Prior Publication Data

US 2020/0248807 A1 Aug. 6, 2020

Related U.S. Application Data

(62) Division of application No. 15/627,741, filed on Jun. 20, 2017, now Pat. No. 10,632,841.

(30) Foreign Application Priority Data

Jun. 22, 2016 (JP) ................................ 2016-123937
Jun. 22, 2016 (JP) ................................ 2016-123938

(51) Int. Cl.
*B60W 30/18* (2012.01)
*B60K 17/28* (2006.01)
(Continued)

(52) U.S. Cl.
CPC .............. *B60K 17/28* (2013.01); *B60K 25/06* (2013.01); *B60W 10/182* (2013.01);
(Continued)

(58) Field of Classification Search
CPC ......... B60W 30/1888; B60W 2510/186; F16H 2059/446
See application file for complete search history.

(56) References Cited

U.S. PATENT DOCUMENTS 4,967,182 A 10/1990 Foster
4,974,711 A 12/1990 Peterson et al.
(Continued)

FOREIGN PATENT DOCUMENTS

DE 10 2004 027 294 12/2004
JP 05-089064 12/1993
(Continued)

OTHER PUBLICATIONS

Extended European Search Report in respect to European Application No. 17177048.0, dated Jan. 19, 2018.
(Continued)

*Primary Examiner* — Edwin A Young
(74) *Attorney, Agent, or Firm* — Greenblum & Bernstein, P.L.C.

(57) ABSTRACT

A drive device for a PTO shaft includes a parking switch to detect a parking state of a vehicle body, a permission switch constituted of a self-returning switch and connected to the parking switch, the permission switch being configured to be switched to permit driving a PTO shaft, the PTO shaft being configured to be driven by a power of a prime mover disposed on the vehicle body, and a first switch device to be switched to enable the PTO shaft to be driven when the permission switch is switched to permit driving the PTO shaft under a state where the parking switch detects the parking state of the vehicle body.

1 Claim, 12 Drawing Sheets

(51) Int. Cl.

| | |
|---|---|
| ***B60W 30/188*** | (2012.01) |
| ***B60W 10/30*** | (2006.01) |
| ***B60W 10/18*** | (2012.01) |
| ***F16H 63/48*** | (2006.01) |
| ***B60K 25/06*** | (2006.01) |
| ***F16D 48/04*** | (2006.01) |
| ***F16D 48/10*** | (2006.01) |
| *B60W 40/08* | (2012.01) |
| *B60W 50/14* | (2020.01) |
| *F16H 57/02* | (2012.01) |
| *F16H 59/44* | (2006.01) |
| *F16H 61/02* | (2006.01) |
| *F16D 48/06* | (2006.01) |

(52) U.S. Cl.

CPC ........ *B60W 10/30* (2013.01); *B60W 30/1888* (2013.01); *F16D 48/04* (2013.01); *F16D 48/10* (2013.01); *F16H 63/483* (2013.01); *B60W 2040/0881* (2013.01); *B60W 2050/143* (2013.01); *B60W 2510/186* (2013.01); *B60W 2510/188* (2013.01); *B60W 2510/305* (2013.01); *B60W 2710/188* (2013.01); *F16D 48/06* (2013.01); *F16H 2057/02056* (2013.01); *F16H 2059/446* (2013.01); *F16H 2061/026* (2013.01)

(56) References Cited

U.S. PATENT DOCUMENTS

| | | | | |
|---|---|---|---|---|
| 6,135,230 | A * | 10/2000 | Schenck | E02F 9/24 180/269 |
| 8,323,153 | B2 | 12/2012 | Deblack | |
| 8,447,479 | B2 | 5/2013 | Unemoto | |
| 2005/0028311 | A1 | 12/2005 | Katrak | |
| 2008/0257631 | A1 * | 10/2008 | Onderko | A01D 34/828 180/279 |
| 2014/0172270 | A1 | 6/2014 | Lee et al. | |

FOREIGN PATENT DOCUMENTS

| | | | |
|---|---|---|---|
| JP | 0958296 | | 3/1997 |
| JP | 2004-352152 | | 12/2004 |
| JP | 2008-063969 | | 3/2008 |
| JP | 2010-143244 | A | 7/2010 |
| JP | 2012-030616 | | 2/2012 |
| JP | 2013-132936 | | 7/2013 |
| JP | 2014-024511 | | 2/2014 |
| JP | 2014-065323 | A | 4/2014 |
| JP | 2015-223894 | A | 12/2015 |

OTHER PUBLICATIONS

Raw translation of Lyberger, Power-take-off method for coupling to a vehicle's power-take-off carries, Dec. 30, 2004, 9 pages. (Year: 2004).

* cited by examiner 20
128
30 (17)
131
Alarm
PTO driver
Checker
124a
124b
124c
124
Controller
1st Controller
2nd Controller
3rd Controller
132d
132c
132a
132b
L14
L13
L12
L11
123
2nd SW (External PTO SW)
Parking SW
1st detection SW
2nd detection SW
Seat SW
Travel detector
122
123a
123b
127
126
121(1st SW, Internal PTO SW)
121b
125c
129c
129b
125b
21c4(21c)
21c3(21c)
121a
125a
129a
21c1(21c)
21c2(21c)

B2
B1
A1
Checking eng. start
SW confirmation
SW alarming
A2
PTO stopping
A5
Internal switching
A6
Absence alarming
A3
1st external switching
A4
2nd external switching 1
2
3
4
5
6
7
8

DRIVE DEVICE FOR PTO SHAFT OF WORKING MACHINE

CROSS-REFERENCE TO RELATED APPLICATIONS

The present application is a divisional application of U.S. application Ser. No. 15/627,741, filed Jun. 20, 2017, which claims priority under 35 U.S.C. § 119 to Japanese Patent Application No. 2016-123937, filed Jun. 22, 2016 and to Japanese Patent Application No. 2016-123938, filed Jun. 22, 2016. The contents of these applications are incorporated herein by reference in their entirety.

BACKGROUND OF THE INVENTION

Field of the Invention

The present invention relates to a drive device for a PTO shaft of a wok machine.

Discussion of the Background

Japanese patent application publication No. 2012-30616 and Japanese patent application publication No. 2013-132936 disclose the techniques relating to a driving method of a PTO shaft of a work machine such as a tractor, the PTO shaft being configured to be driven by an engine.

The tractor disclosed in Japanese patent application publication No. 2012-30616 includes a PTO select switch, a detection switch, and a control device. The PTO select switch is configured to turn on and off the driving of the PTO shaft. The detection switch is configured to detect a state of a parking brake. The control device is configured to control the stopping of the engine, that is, the driving of the PTO shaft on the basis of the states of the PTO select switch and the detection switch. In the case where the PTO select switch is tuned on and the detection switch detects the activation of the parking brake, the control device maintains the driving of the PTO shaft without stopping the engine.

The tractor disclosed in Japanese patent application publication No. 2013-132936 includes an internal PTO switch and an external PTO switch. The internal PTO switch is arranged inside a cabin of the tractor and the like and configured to turn on and off the driving of the PTO shaft. The external PTO switch is arranged on a fender of the tractor and is configured to turn on and off the driving of the PTO shaft. When a driver (an operator) in the cabin operates the internal PTO switch, the PTO shaft is to be driven. In addition, when an operator outside the cabin operates the external PTO switch, the PTO shaft is to be driven.

SUMMARY OF THE INVENTION

A drive device for a PTO shaft of a work machine includes a parking switch to detect a parking state of a vehicle body, a permission switch constituted of a self-returning switch and connected to the parking switch, the permission switch being configured to be switched to permit driving a PTO shaft, the PTO shaft being configured to be driven by a power of a prime mover disposed on the vehicle body, and a first switch device to be switched to enable the PTO shaft to be driven when the permission switch is switched to permit driving the PTO shaft under a state where the parking switch detects the parking state of the vehicle body.

A drive device for a PTO shaft of a work machine includes a parking switch to detect a parking state of a vehicle body, a first switch arranged on an operation portion disposed on the vehicle body, the first switch being configured to be switched to enable the PTO shaft to be driven, the PTO shaft being disposed on the vehicle body, a second switch arranged on a portion different from the operation portion, the second switch being configured to be switched to enable the PTO shaft to be driven; and a controller to drive the PTO shaft when any one of the first switch and the second switch is turned on, wherein the controller includes a first controller to stop driving the PTO shaft when the parking switch does not detect the parking state of the vehicle body under a state where the second switch is turned on to drive the PTO shaft.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
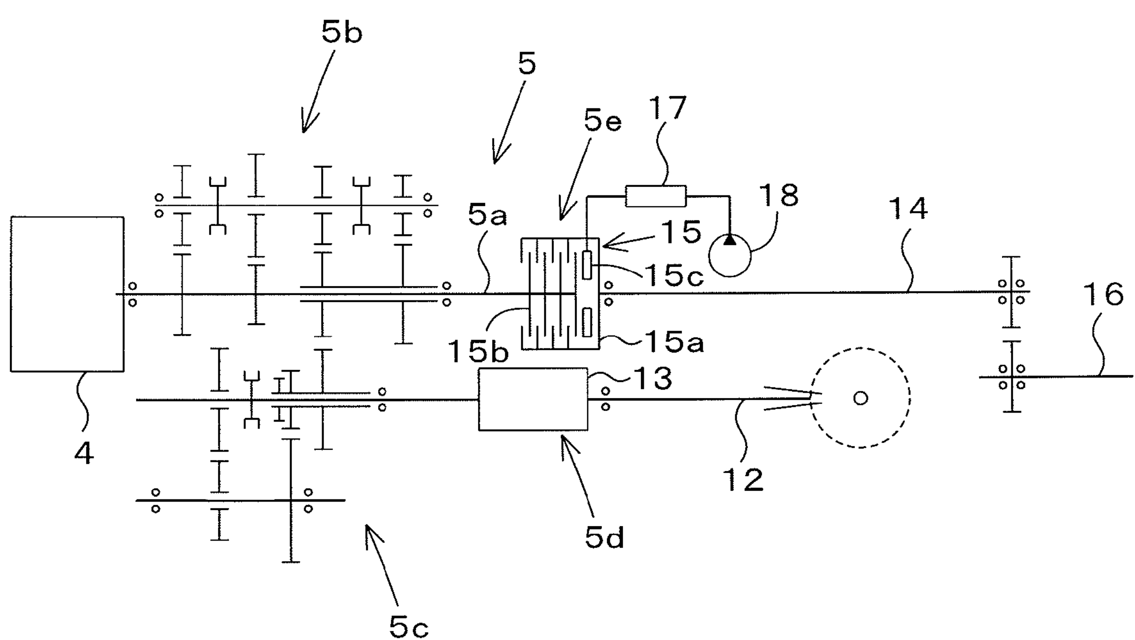
FIG. 1 is a schematic view illustrating a general configuration of a speed-change device according to a first embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Referring to drawings, an embodiment of the present invention will be described below.

First Embodiment

Figure 13:
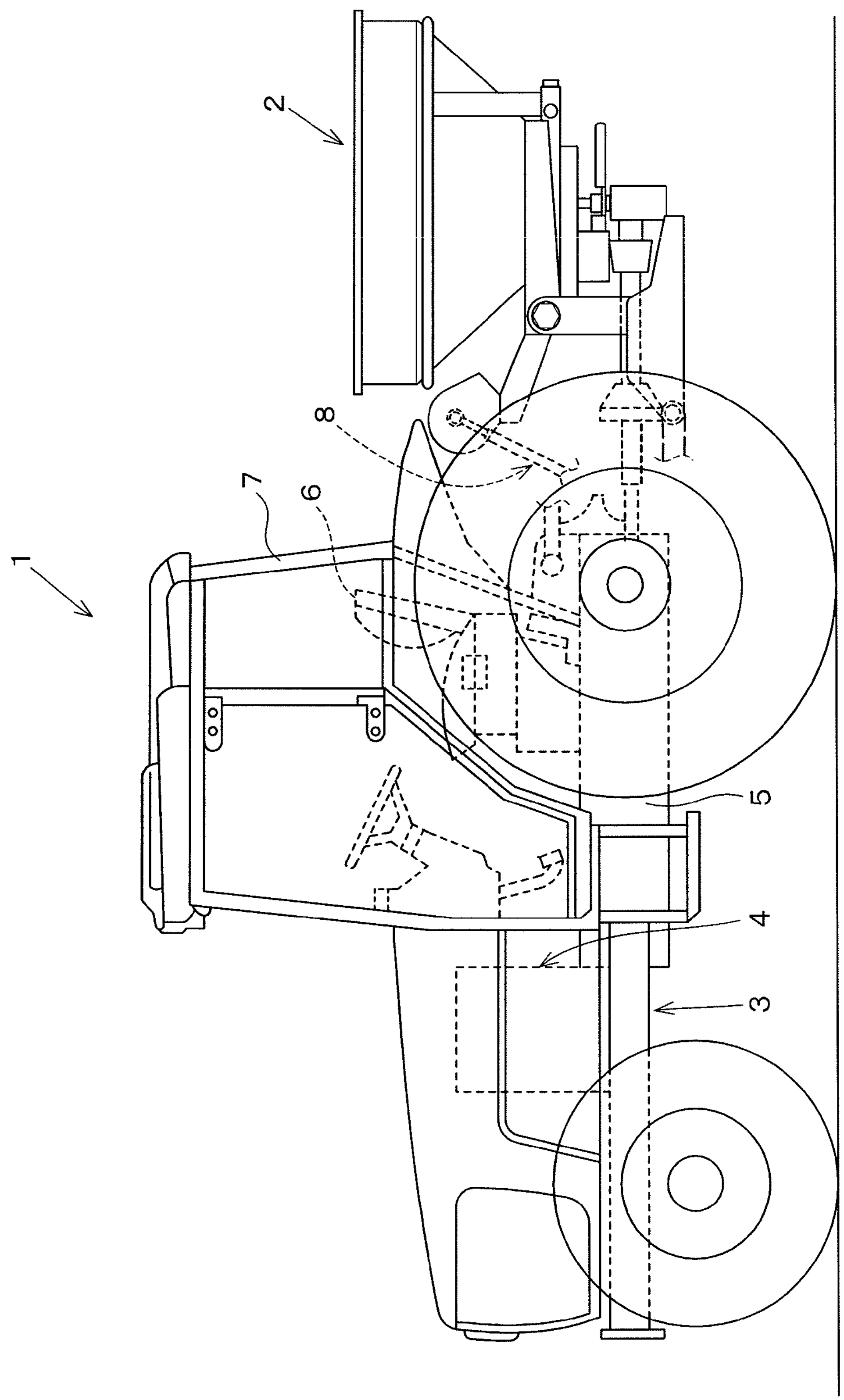
FIG. 13 is a general view illustrating a work machine according to the embodiments.

FIG. 13 illustrates a general view of a work machine a according to a first embodiment of the present invention, the work machine 1 having a drive device for a PTO shaft. The work machine 1 illustrated in FIG. 13 is a tractor. However, the work machine 1 is not limited to the tractor, and may be an agricultural machine such as a combine and a rice planting machine, a construction machine, and the like.

A general configuration of the tractor 1 will be explained first.

As shown in FIG. 13, the tractor 1 includes a traveling vehicle body (hereinafter referred to as a vehicle body) 3, a prime mover 4, and a speed-change device 5. The vehicle body 3 includes wheels. The prime mover 4 is constituted of any one of a diesel engine, a gasoline engine, an electric motor, and the like. In the embodiment, the prime mover 4 is constituted of the diesel engine (hereinafter simply referred to as an engine).

The vehicle body 3 is provided with an operator seat 6 and a cabin 7 surrounding the operator seat 6. In addition, a connection portion (a connector) 8 is disposed on a rear portion of the vehicle body 3. The connection portion 8 is constituted of a three-point linkage mechanism or the like. A work device 2 is configured to be attached to and detached from the connection portion 8. For example, the work device 2 such as a tilling device (a tiller), a fertilizing device (a fertilizer), a chemicals distribution device (a chemicals distributor), or the like is connected to the connection portion 8, and thereby the travel vehicle body 3 trails the work device 2.

As shown in FIG. 1, the speed-change device 5 includes a main shaft (a thrust shaft) 5*a*, a main speed-change portion (a main speed changer) 5*b*, a sub speed-change portion (a sub speed changer) 5*c*, a shuttle portion (a shuttle) 5*d*, and a PTO power transmitting portion (a PTO power transmission) 5*e*. The thrust shaft 5*a* is supported rotatably by a housing case of the speed-change device 5, and thereby a motive power outputted from a crank shaft of the engine 4 is transmitted to the thrust shaft 5*a*.

The main speed-change portion 5*b* includes a plurality of gears and a shifter. The shifter is configured to change the linkage (engagement) between the plurality of gears. The main speed-change portion 5*b* arbitrarily changes the linkage (engagement) between the plurality of gears with use of the shifter, thereby changing and outputting the revolution inputted from the thrust shaft 5*a* (changing the speed).

The sub speed-change portion 5*c* includes a plurality of gears and a shifter as in the main speed-change portion Sc. The shifter is configured to change the linkage (engagement) between the plurality of gears. The sub speed-change portion 5*c* arbitrarily changes the linkage (engagement) between the plurality of gears with use of the shifter, thereby changing and outputting the revolution inputted from the main speed-change portion 5*b* (changing the speed).

The shuttle portion 5*d* includes a shuttle shat 12 and a forward-movement backward-movement switch portion (a forward-movement backward-movement switch) 13. A motive power outputted from the sub speed-change portion 5*c* is transmitted to the shuttle shaft 12 through the gears. The forward-movement backward-movement switch portion 13 is constituted of a hydraulic clutch or the like, for example. The forward-movement backward-movement switch portion 13 engages the hydraulic clutch and releases the engagement, thereby switching a revolution direction of the shuttle shaft 12, that is, one of the forward movement and the backward movement of the tractor 1 to the other.

The PTO power transmitting portion 5*e* includes a PTO thrust shaft 14 and a PTO clutch 15. The PTO thrust shaft 14 is supported rotatably, and is capable of transmitting a motive power outputted from the thrust shaft 5*a*. The PTO thrust shaft 14 is connected to the PTO shaft 16 by the gears or the like.

The PTO clutch 15 is constituted of a clutch configured to be switched from any one of a first movement and a second movement to the other. The first movement transmits the motive power of the thrust shaft 5*a* to the PTO thrust shaft 14. The second movement does not transmit the motive power of the thrust shaft 5*a* to the PTO thrust shaft 14.

In particular, the PTO clutch 15 is constituted of a hydraulic clutch, and includes a housing 15*a*, a clutch member 15*b*, and a piston 15*c*. The housing 15*a* is configured to turn integrally with the PTO thrust shaft 14. The clutch member 15*b* is configured to turn integrally with the thrust shaft 5*a*. The piston 15*c* is configured to move in the housing 15*a* with use of the operation fluid.

In this manner, when the piston 15*c* is moved to make the clutch member 15*b* contact to the housing 15*a*, the PTO clutch 15 shifts to the first movement, the motive power from the engine 4 is transmitted to the PTO thrust shaft 14 through the thrust shaft 5*a* and the PTO clutch 15, and then a motive power of the PTO thrust shaft 14 is transmitted to the PTO shaft 16.

That is, the PTO shaft 16 is driven by the motive power of the engine 4 through the speed-change device 5. On the other hand, when the piston 15*c* is moved to the opposite direction to make the clutch member 15*b* separate from the housing 15*a*, the PTO clutch 15 shifts to the second movement, the motive power from the thrust shaft 5*a* is not transmitted to the PTO thrust shaft 14, and then a motive power of the PTO thrust shaft 14 is cut off.

Meanwhile, the transmitting and the cutting-off of the motive power by the PTO clutch 15 are carried out by an operation valve 17 (a switch valve) connected to the piston 15*c* by a fluid tube (a fluid path). A pump 18 is connected to the operation valve 17. The pump 18 is configured to supply the operation fluid (a fluid).

Figure 2:
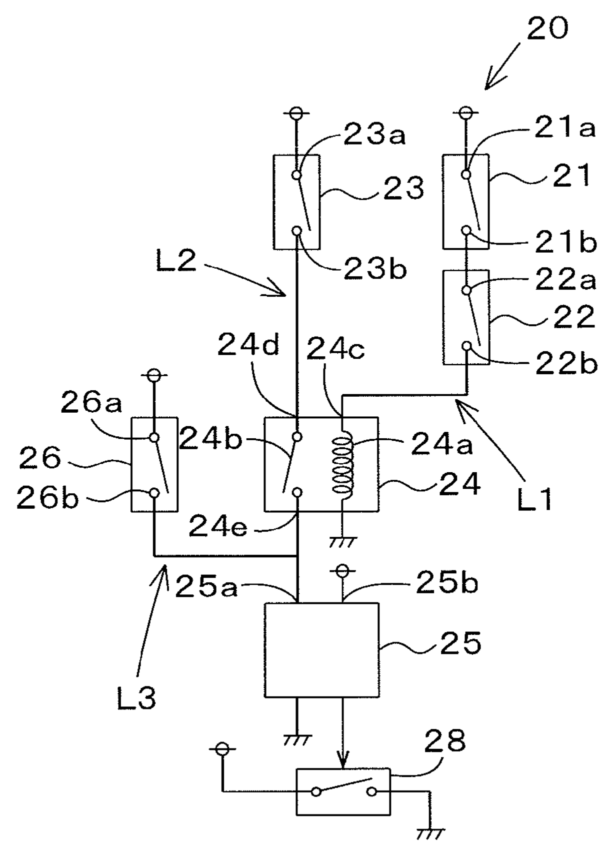
FIG. 2 is a general view illustrating a drive device for a PTO shaft according to the first embodiment.

FIG. 2 illustrates a drive device 20 for the PTO shaft.

The drive device 20 for the PTO shaft includes a parking switch (a parking SW) 21, a permission switch (a permission SW) 22, an on-off switch (an on-off SW) 23, a first switch device 24, and a second switch device 25. The drive device 20 for the PTO shaft includes a seat switch 26.

The parking switch 21 is constituted of a switch configured to detect the parking of the travel vehicle body (the vehicle body) 3. In particular, the parking switch 21 is configured to be switched to be ON and to be OFF. The parking switch 21 is switched to be ON by the swinging of the parking lever when a parking lever (a parking brake) is positioned at a position (a brake position) to brake the vehicle body 3, and thereby the parking is detected.

The parking switch 21 is switched to be OFF by the swinging of the parking lever when the parking lever is positioned at a position (a release position) to release the braking of the vehicle body 3, and thereby the parking is not detected.

The permission switch 22 is constituted of a switch configured to be switched to permit or not to permit driving the PTO shaft 16. The permission switch 22 is a switch to be operated by an operator (a driver), and is arranged in the vicinity of the operator seat, on a side portion of the vehicle body 3, or on a rear portion of the vehicle body 3, for example.

Meanwhile, an arrangement position of the permission switch 22 is not limited to the positions mentioned above. For convenience of the explanation, the permission relating to the driving of the PTO shaft 16 will be referred to as "a PTO permission" below, and the non-permission relating to the driving of the PTO shaft 16 will be referred to as "a PTO non-permission" below.

The permission switch 22 is configured to be switched to be ON and to be OFF, and is constituted of a self-returning switch. The self-returning switch does not maintain an ON state and an OFF state after the switching. For example, the permission switch 22 is constituted of a momentary switch. The permission switch 22 provides the PTO permission under the ON state and provides the PTO non-permission under the OFF state.

The on-off switch 23 is configured to switch the driving of the PTO shaft 16 to be turned on and to be turned off. For example, the on-off switch 23 sets the driving of the PTO shaft 16 to be turned on under the ON state and to be turned off under the OFF state.

The on-off switch 23 is arranged in the vicinity of the operator seat 6, and is configured to be operated by the operator (the driver). When the on-off switch 23 is switched to be ON, the operation valve 17 is switched to a predetermined position, the PTO clutch 15 performs the first movement, and thereby the PTO shaft 16 is driven (revolved).

On the other hand, when the on-off switch 23 is switched to be OFF, the operation valve 17 is switched to another predetermined position, the PTO clutch 15 performs the second movement, and thereby the PTO shaft 16 stops being driven (revolved).

The seat switch 26 is constituted of a switch configured to detect the operator seated on the operator seat 6 (that is, to detect the seating on the operator seat 6). For example, the seat switch 26 is configured to be switched to be ON and to be OFF. The seat switch 26 is arranged in a seat of the operator seat 6 (a bottom seat, a backrest), under the seat, or the like.

When the operator is seated on the seat, the seat switch 26 is switched to be ON, and thereby detecting the seating. In addition, when the operator gets off the seat, the seat switch 26 is switched to be OFF, and thereby not detecting the seating (detecting the not-seating (absence)).

The first switch device 24 is constituted of a device configured to be switched to enable the PTO shaft to be driven when the permission switch 22 is switched to permit driving the PTO shaft (switched to be ON) under a state where the parking switch 21 detects the parking state of the vehicle body 3. The first switch device 24 is constituted of any one of a dynamic relay (a contact relay), a static relay (a contactless relay), a sequencer, and the like.

In the embodiment, the first switch device 24 is constituted of the contact relay including a coil portion 24*a*, a switch portion 24*b*, a first input terminal 24*c*, and a second input terminal 24*d*.

Meanwhile, the first switch device (the relay) 24 may be "a single stable type", "a latching type", and other types of relays. The single stable type switches the switch portion 24*b* to be ON when the coil portion 24*a* is magnetized. The latching type switches the switch portion 24*b* by latching the magnetization of the coil portion 24.

The first switch device 24 supplies an electric power to the second switch device 25 when an electric current is supplied to the coil portion 24*a* to switch the switch portion 24*b* to be ON, and thereby the PTO shaft 16 is driven. On the other hand, the first switch device 24 stops supplying the electric power to the second switch device 25 when the electric current is not supplied to the coil portion 24*a* to switch the switch portion 24*b* to be OFF, and thereby the driving of the PTO shaft 16 is stopped.

The second switch device 25 is constituted of a device configured to maintain and stop the driving of the PTO shaft 16. That is, the second switch device 25 includes a third input terminal 25*a*, a fourth input terminal 25*b*, and a solenoid (not shown in the drawings). When an electric current is supplied to the third input terminal 25*a* and the fourth input terminal 25*b* of the second switch device 25, the solenoid is not activated, an operation of the engine 4 is maintained, and thereby the driving of the PTO shaft 16 is maintained.

On the other hand, when the electric supply to the third input terminal 25*a* of the second switch device 25 is stopped, the solenoid is activated, a key switch (an ignition switch) 28 is switched to be off (to an engine stopping position). In this manner, the driving of the PTO shaft 16 is stopped. In the embodiment, the second switch device 25 turns on and off the operation of the engine 4, and thereby stopping the driving of the PTO shaft 16. However, the second switch device 25 may employ another method.

In addition, the second switch device 25 may include a timer. That is, the timer counts a duration time (a releasing time) of the releasing of the electric supply to the third input terminal 25*a* of the second switch device 25. In this manner, the solenoid may be activated when the releasing time reaches a predetermined time, and thus the key switch 28 may be switched to be off (to the engine stopping position).

Connections between the parking switch 21, the permission switch 22, the on-off switch 23, the first switch device 24, the second switch device 25, and the seat switch 26 will be explained next.

An input terminal 21*a* of the parking switch 21 is connected to an electric power source system. An output terminal 21*b* of the parking switch 21 is connected to an input terminal 22*a* of the permission switch 22. That is, the parking switch 21 and the permission switch 22 are connected in series to each other.

An output terminal 22*b* of the permission switch 22 is connected to a first input terminal 24*c* of the first switch device 24. That is, an output terminal 22*b* of the permission switch 22 is connected to the coil 24*a* of the first switch device 24.

An input terminal 23*a* of the on-off switch 23 is connected to the electric power source system. An output terminal 23*b* of the on-off switch 23 is connected to a second input terminal 24*d* of the first switch device 24. That is, an output terminal 23*b* of the on-off switch 23 is connected to one end of the switch 24*b*.

Thus, in view of the first switch device 24, the permission switch 22 is connected to the first input terminal 24*c* of the first switch device 24. The on-off switch 23 is connected to the second input terminal 24*d* of the first switch device 24. Meanwhile, the permission switch 22 and the on-off switch 23 may be connected to the first switch device 24 inversely.

That is, the output terminal 22*b* of the permission switch 22 may be connected to the second input terminal 24*d* of the first switch device 24. The output terminal 23*b* of the on-off switch 23 may be connected to the first input terminal 24*c* of the first switch device 24.

The output terminal 24*e* of the first switch device 24 is connected to the third input terminal 25*a* of the second switch device 25. In addition, the output terminal 26*b* of the seat switch 26 is connected to the third input terminal 25*a* of the second switch device 25.

Meanwhile, the input terminal 26*a* of the seat switch 26 is connected to the electric power source. The fourth input terminal 25*b* of the second switch device 25 is connected to the electric power source.

As shown in FIG. 2, in view of the connections between the switches (the parking switch 21, the permission switch 22, the on-off switch 23, and the seat switch 26) and the switch devices (the first switch device 24 and the second switch device 25), the drive device 20 for the PTO shaft includes a first system L1, a second system L2, and a third system L3.

Each of the first system L1, the second system L2, and the third system L3 is constituted of the wiring members and the like connecting the switches and the switch devices to each other.

The first system L connects the parking switch 21 and the permission switch 22 in series to each other, and further connects the output terminal 22*b* of the permission switch 22 to the first input terminal 24*c* of the first switch device 24.

Meanwhile, reversing the order of the series connection between the parking switch 21 and the permission switch 22 shown in FIG. 1, a reversed system connecting the output terminal 22*b* of the parking switch 21 to the first input terminal 24*c* of the first switch device 24 may be referred to as the first system L1.

The second system L2 connects the output terminal 22*b* of the on-off switch 23 to the second input terminal 24 of the first switch device 24, and connects the output terminal 24*e* of the first switch device 24 to the third input terminal 25*a* of the second switch device 25.

The third system L3 connects the output terminal 26*b* of the seat switch 26 to the third input terminal 25*a* of the second switch device 25.

Thus, the drive device 20 of the PTO shaft includes the first system L1, the second system L2, and the third system L3. In this manner, the controls relating to the driving of the PTO shaft 16 are carried out in each of the first system L1 to the third system L3, the independency of the controls is improved, and thereby improving the safety.

The following explanations describe the working (the stationary PTO) carried out by the motive power of the PTO shaft 16 under the condition that the tractor is parked (stopped). For convenience of the explanations, the ignition switch 28 is turned on and the engine 4 is in operation before the stationary PTO.

In the working under the stationary PTO, the operator turns on the on-off switch 23. The electric power source (an electric power) of the second system L2 is then supplied to the switch 24*b* of the first switch device 24.

In addition, the operator sets the parking lever to the brake position and switches the parking switch 21 to be ON. Then, the operator switches the permission switch 22 to be ON. The electric power source (an electric power) of the first system L1 is supplied to the coil 24*b* of the first switch device 24. In this manner, the first switch device 24 is switched to be ON, and thereby the electric voltage (an electric current) supplied to the third input terminal 25*a* of the second switch device 25.

In this manner, the PTO shaft 16 can be driven under the state where the tractor 1 is parked. That is, when the parking of the vehicle body 3 is detected and the permission switch is switched to be under the PTO permission, the work device 2 can perform the working under the state where the tractor 1 is parked.

In the case where the permission switch 22 employs a self-retaining switch, the permission switch 22 is not switched to be under the PTO non-permission unless the permission switch 22 is pushed again. In that case, the permission switch 22 is still ON without the pushing in the case where the parking lever is set to the brake position again or the ignition switch 28 is switched to be ON again after the parking lever is set to the brake release position again or the ignition switch 28 is turned to be OFF again, for example.

Thus, in the case where the permission switch 22 is constituted of the self-retaining switch, not only the operator forgets to return the permission switch 22, but also the permission switch 22 is capable of being switched to be under the PTO permission constantly, and thus the PTO shaft is driven at the unexpected timing because of the operator's mistake or the like.

Meanwhile, the permission switch 22 is constituted of the self-returning switch in the embodiment. Thus, in the case where the first switch device 24 is the single stable type, the PTO permission is set only during the permission switch 22 is pushed. In the case where the PTO permission is set only during the permission switch 22 is pushed, the timing to stop the PTO shaft 16 can be easily set in comparison with the self-retaining type, and thereby the operability can be improved in the stationary PTO.

Additionally, in the case where the PTO permission is set only during the permission switch 22 is pushed, the PTO shaft is not driven as in the self-retaining type even when the operator forgets to return the permission switch 22, and thereby the PTO shaft is prevented from being driven because of the forgetting of returning the permission switch 22.

In the case where the first switch device 24 is the latching type, the PTO permission is switched to the PTO non-permission when some movements or states are carried out after the permission switch 22 is pushed. For example, in the case where the ignition switch 28 is turned to be off from on again, the PTO non-permission is set without pushing the permission switch 22 again.

Meanwhile, the first switch device 24 may be configured to switch the state from the PTO permission to the PTO non-permission when the parking lever is positioned to the brake release position.

Second Embodiment

Figure 3:
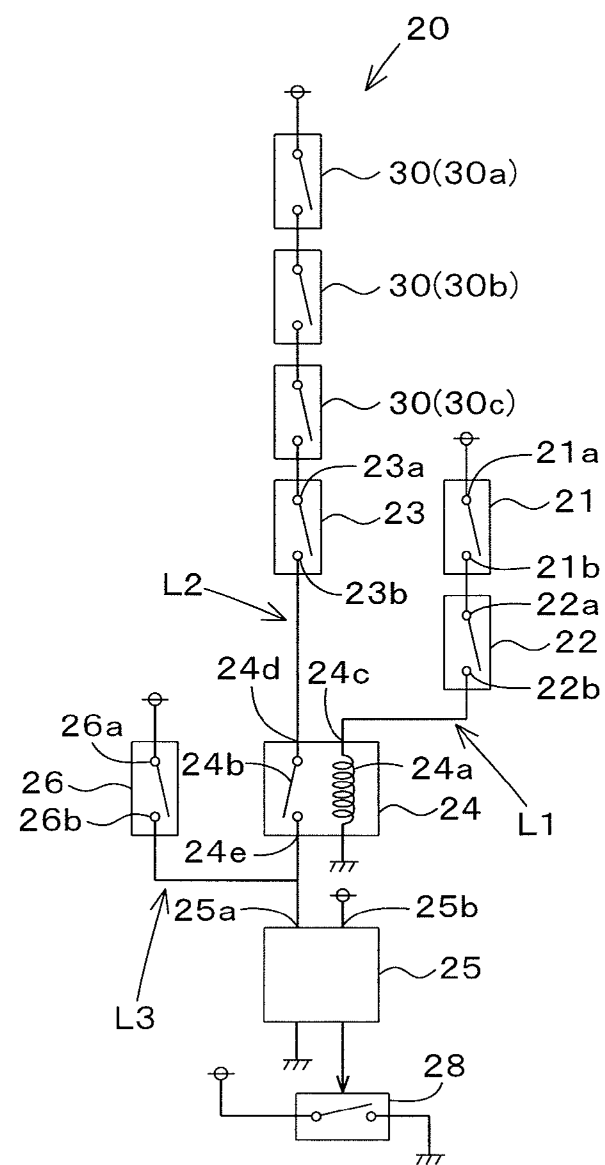
FIG. 3 is a general view illustrating a drive device for a PTO shaft according to a second embodiment of the present invention.

FIG. 3 is a view illustrating the drive device 20 for the PTO shaft according to a second embodiment of the present invention. The drive device for the PTO shaft according to the second embodiment can be employed as the drive device for the PTO shaft according to the first embodiment mentioned above. Explanation of configurations similar to the configurations of the first embodiment will be omitted.

As shown in FIG. 3, the drive device 20 for the PTO shaft includes a plurality of first neutral switches 30. The plurality of first neutral switches 30 are constituted of switches configured to detect that a plurality of devices mounted on the vehicle body 3 are at neutral positions. The plurality of first neutral switches 30 are disposed respectively corresponding to the plurality of devices.

The plurality of devices serve as devices configured to perform the movements relating to the traveling, for example, as a forward-backward switch valve, a speed-change lever, a clutch pedal, and the like. The forward-backward switch lever is constituted of a lever configured to be switched (move) to a forward traveling position, a backward traveling position, and a neutral position. The forward-backward switch lever at the forward traveling position switches the shuttle portion 5*d* to the forward traveling, and the forward-backward switch lever at the backward traveling position switches the shuttle portion 5*d* to the backward traveling.

The speed-change lever is constituted of a lever configured to change a speed of the main speed-change portion 5*b* or the sub speed-change portion 5*c*, and connected to a shifter by a linkage mechanism and the like. The speed-change lever is capable of being switched to a neutral position and positions (speed-change positions) corresponding to the speed-change of the main speed-change portion 5*b* or the sub speed-change portion 5*c*. The clutch pedal is swingably supported in the vicinity of the operator seat 6, and connects and cuts off a motive power transmission to a differential device or a drive shaft supporting the wheels.

For example, the first neutral switch 30 includes a first switch 30*a*, a second switch 30*b*, and a third switch 30*c*. The first switch 30*a* is configured to detect the neutral position of the forward-backward switch lever. The second switch 30*b* is configured to detect the neutral position of the speed-change lever. The third switch 30*c* is configured to detect the neutral position of the clutch pedal.

Each of the first switch 30*a*, the second switch 30*b*, and the third switch 30*c* is a switch configured to be switched to be ON and OFF, and are switched to be ON when detecting the neutral position.

The first switch 30*a*, the second switch 30*b*, and the third switch 30*c* are connected in series. An input terminal of the first switch 30*a* is connected to the electric power source system. An output terminal of the third switch 30*c* is connected to the input terminal 23*a* of the on-off switch 23.

In this manner, when all of the first switch 30*a*, the second switch 30*b*, and the third switch 30*c* detect the neutral positions, an electric power can be supplied to the input terminal 23*a* of the on-off switch 23.

Thus, the first switch device 24 switches the driving of the PTO shaft to be turned on when all of the first neutral switches 30 detect the neutral positions under the state where the on-off switch 23 is switched to be ON and when the permission switch 22 is switched to permit driving the PTO shaft 16 under the state where the parking switch 21 detects the parking of the vehicle body 3.

That is, the first switch device 24 is turned ON when the first neutral switch 30 detects the neutral positions of at least two travel devices. That is, not only the parking switch 21 but the first neutral switch 30 configures the condition to certainly stop (park) the vehicle body 3.

In this manner, the PTO shaft 16 is driven and thus the work device 2 performs the working under the state where the tractor 1 steadily parks.

In the embodiment mentioned above, the plurality of first neutral switches 30 are switches configured to detect the neutral positions of three devices. However, the plurality of first neutral switches 30 may be switches configured to detect the neutral positions of at least two devices.

In addition, the first neutral switch 30 may be a switch configured to detect the neutral position of a shuttle pool of the speed-change device, a switch configured to detect a state (a neutral position) where the acceleration pedal to set the traveling is not pressed under the state where the prime mover is a hydraulic drive device (an HST), or another switch.

Third Embodiment

Figure 4:
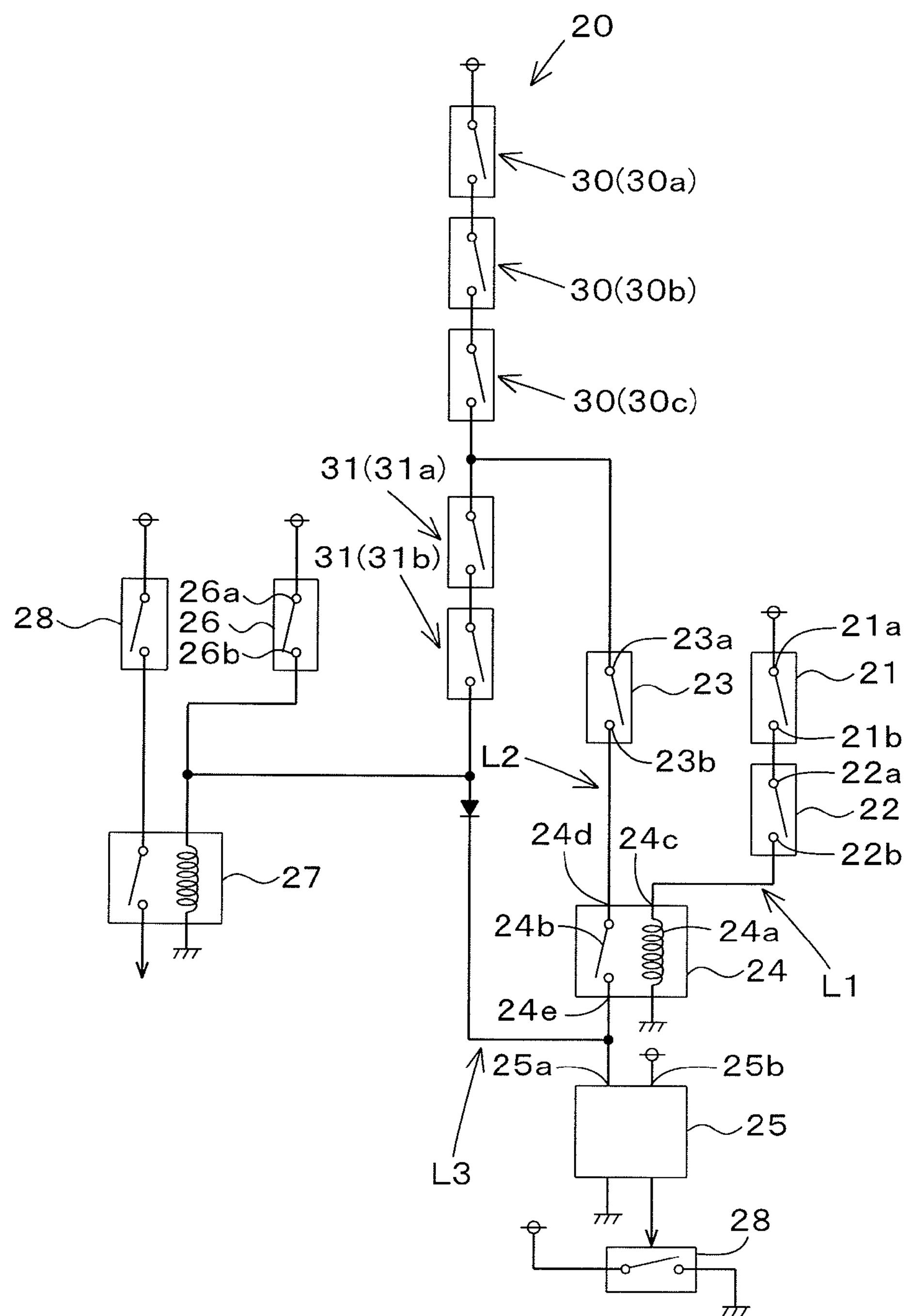
FIG. 4 is a general view illustrating a drive device for a PTO shaft according to a third embodiment of the present invention.
Figure 5:
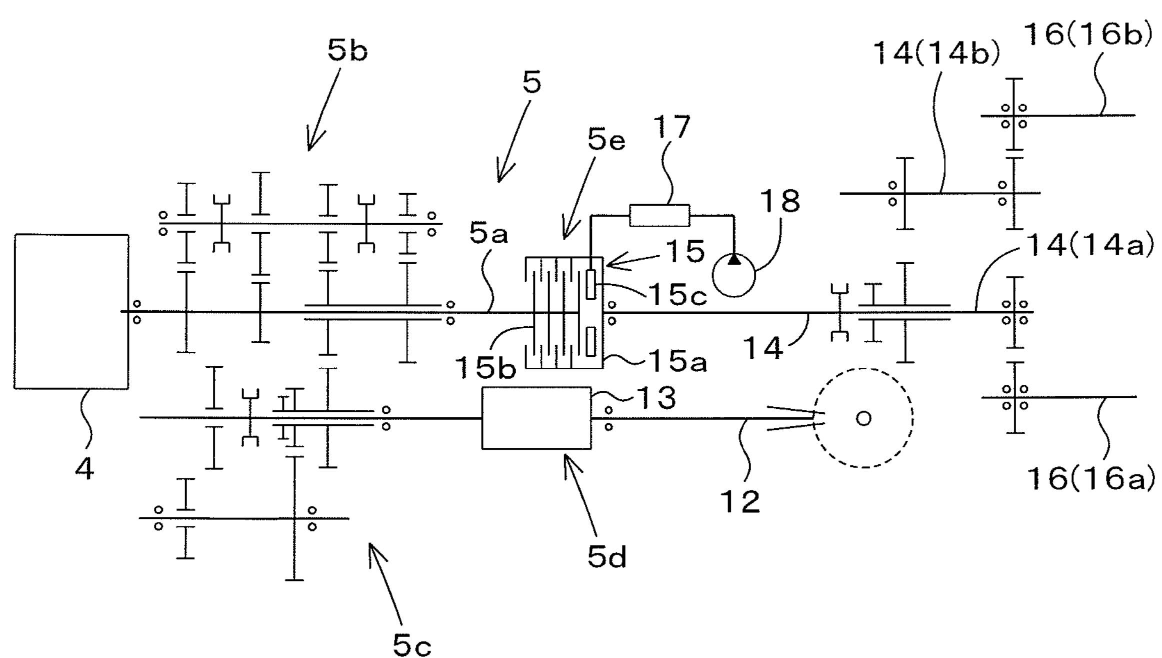
FIG. 5 is a view illustrating a part of a speed-change device according to the third embodiment.

FIG. 4 is a view illustrating the drive device 20 for the PTO shaft according to a third embodiment of the present invention. FIG. 5 is a view illustrating a part of the speed-change device 5 according to the third embodiment. The drive device for the PTO shaft according to the third embodiment can be employed as the drive device for the PTO shaft according to the first embodiment and the second embodiment mentioned above. Explanation of configurations similar to the configurations of the first embodiment and the second embodiment will be omitted.

As shown in FIG. 5, the PTO shafts 16 of the tractor 1 are disposed on a front portion of the tractor 1 and on a rear portion of the tractor 1. The PTO shaft 16 on the rear portion and the PTO shaft 16 on the front portion can be driven separately. In particular, the PTO thrust shaft 14 of the PTO power transmitting portion 5*e* includes a first PTO thrust shaft 14*a* and a second PTO thrust shaft 14*b*. The PTO shaft 16*a* on the rear portion is connected to the first PTO thrust shaft 14*a*. The PTO shaft 16*a* on the front portion is connected to the second PTO thrust shaft 14*b*.

As shown in FIG. 4, the drive device 20 for the PTO shaft includes a plurality of second neutral switches 31. The plurality of second neutral switches 31 are switches configured to detect the neutrals of the plurality of the PTO shafts (the first PTO thrust shaft 14*a* and the second PTO thrust shaft 14*b*).

Each of the second neutral switch 31 includes a first PTO detection switch 31*a* and a second PTO detection switch 31*b*. Each of the first PTO detection switch 31*a* and the second PTO detection switch 31*b* is a switch configured to be switched to be ON and OFF, and are switched to be ON when detecting the neutral position.

The first PTO detection switch 31*a* and the second PTO detection switch 31*b* are connected in series. An output terminal of the second PTO detection switch 31*b* is connected to an output terminal of the third switch 30*c*. The output terminal of the third switch 30*c* is connected to the input terminal 23*a* of the on-off switch 23.

In this manner, an electric power is continuously supplied when the plurality of second neutral switches 31 detect the neutral position of the PTO shaft 16, and thus the second switch device 25 is capable of continuously operating the engine 4.

In addition, as shown in FIG. 4, the output terminal of the second PTO detection switch 31*b* may be connected to the switch device 27, and the output terminal 26*b* of the seat switch 26 may be connected to the switch device 27 that is connected to a starter.

In that case, the engine 4 can be started when the ignition switch 28 is ON under the state where the first PTO detection switch 31*a* and the second PTO detection switch 31*b* are ON and the seat switch 26 is ON.

Fourth Embodiment

Figure 6:
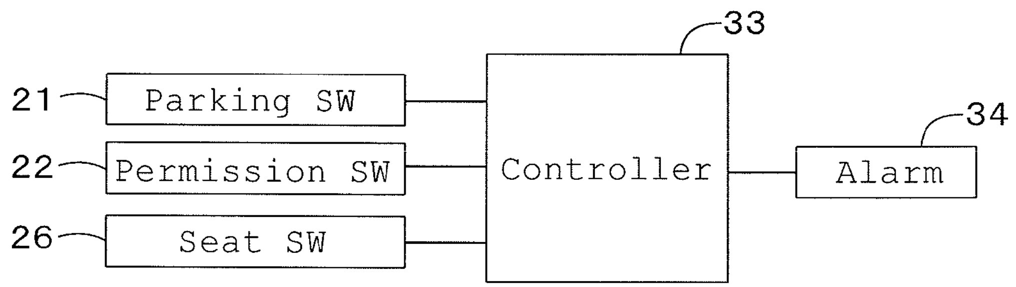
FIG. 6 is a view illustrating an alarm mechanism of a drive device for a PTO shaft according to a fourth embodiment of the present invention.

FIG. 6 is a view illustrating an alarm mechanism in the drive device 20 for the PTO shaft according to a fourth embodiment of the present invention. The drive device for the PTO shaft according to the fourth embodiment can be employed as the drive device for the PTO shaft according to the first embodiment to the third embodiment mentioned above.

A circuit configuration of the drive device for the PTO shaft according to the fourth embodiment is similar to any one of the circuit configurations according to the first embodiment to the third embodiment. Explanation of configurations similar to the configurations of the first embodiment to the third embodiment will be omitted.

As shown in FIG. 6, the drive device 20 for the PTO shaft includes a control device (a controller) 33 and an alarm device (an alarm) 34. The control device 33 is constituted of a CPU or the like, and controls the alarm device 34. The parking switch 21, the permission switch 22, the seat switch 26, and the alarm device 34 are connected to the control device 33.

The alarm device 34 is constituted of a speaker, a LED, a liquid crystal panel, and the like. The alarm device 34 issues an alarm on the basis of signals inputted from the parking switch 21, the permission switch 22, and the seat switch 26 to the control device 33. The alarm device 34 is arranged in the vicinity of the operator seat 6 or around the vehicle body 3.

Figure 7:
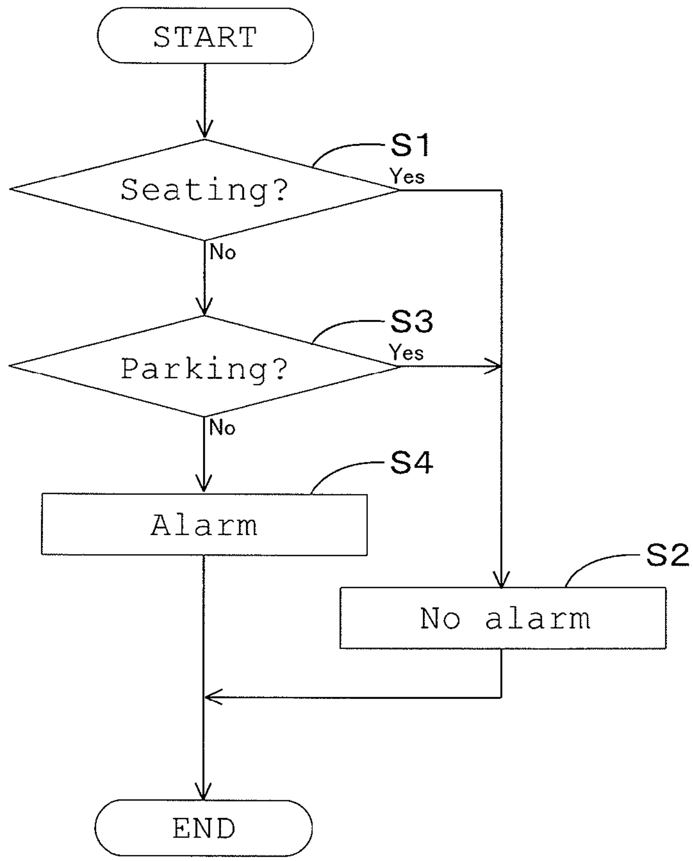
FIG. 7 is a view illustrating a flowchart of operations of a control device and an alarm device according to the fourth embodiment.

FIG. 7 is a view illustrating a flowchart of operations of the control device 33 and the alarm device 34. At the start in FIG. 7, the ignition switch (the key switch) 28 is ON, and the engine 4 is in operation.

As shown in FIG. 7, the control device 33 judges whether the operator is seated on the operator seat 6 under the state where the engine 4 is in operation (S1).

The control device 33 does not make the alarm device 34 issue an alarm (S2) when the seat switch 26 is ON, that is, the operator is seated on the operator seat 6 (S1, Yes).

The control device 33 judges whether the vehicle body 3 is in the parking state (S3) when the seat switch 26 is OFF, that is, the operator is not seated on the operator seat 6 (S1, No).

The control device 33 does not make the alarm device 34 issue the alarm (S2) when the parking switch 21 is ON (S3, Yes), that is, the parking lever is positioned at the brake position.

The control device 33 makes the alarm device 34 issue the alarm (S4) when the parking switch 21 is OFF (S3, No), that is, the parking lever is positioned at the brake release position.

That is, the alarm device 34 issues an alarm when the seat switch 26 does not detect the seating under the state where the parking switch 21 does not detect the parking of the vehicle body 3. That is, the alarm device 34 issues an alarm when the operator is not seated on the operator seat 6 and moves away from the tractor 1 under the state the tractor 1 is not parked, and thereby calling attention to the operator.

Fifth Embodiment

Figure 8:
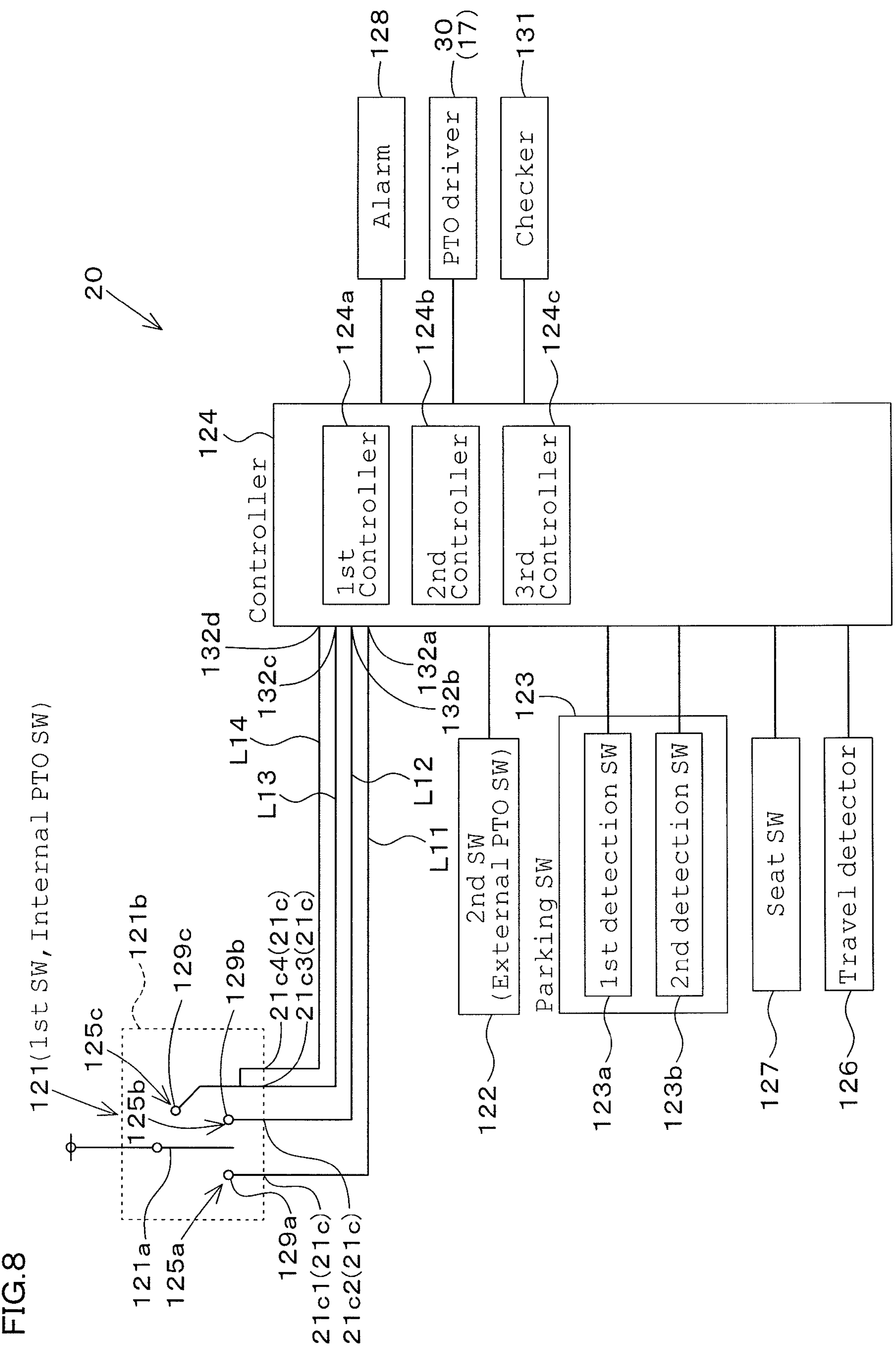
FIG. 8 is a general view illustrating a drive device for a PTO shaft according to a fifth embodiment of the first embodiment.

FIG. 8 is a general view illustrating the drive device 20 for the PTO shaft according to a fifth embodiment of the present invention. Configurations different from the configurations of the embodiments mentioned above will be explained below. The general configurations of the tractor 1 (the work machine 1) is similar to the configurations of the embodiments mentioned above, and thus explanations of the general configurations will be omitted.

As shown in FIG. 13, an operation portion 10 is disposed inside the cabin 7, the operation portion 10 being configured to perform various operations of the tractor 1 (the vehicle body 3). The operation portion 10 is arranged in front of the operator seat 6, on the side of the operator seat 6, or the like. The operation portion 10 includes an operation base 10*a*, an operation tool 10*b*, and a steering wheel 10*c*. The operation base 10*a* is arranged to the side of the operator seat 6. The operation tool 10*b* is arranged on the operation base 10*a*. The steering wheel 10*c* is arranged in front of the operator seat 6.

The operation tool 10*b* is constituted of an operation lever supported swingably, a switch to be switched, a dial being turnable, or the like. The operation valve 17 is constituted of an electromagnetic valve in the embodiment.

As shown in FIG. 8, the drive device 20 for the PTO shaft includes a first switch 121, a second switch 122, a parking switch 123, and the switch device 24. The first switch 121, the second switch 122, and the parking switch 123 are connected to the control device 124. Meanwhile, the switches are indicated by characters "SW" in FIG. 8.

The first switch 121 is disposed on the operation base 10*a* of the operation portion 10, and is a switch to turn on and off the driving of the PTO shaft 16. That is, the first switch 121 is a switch capable of turning on and off the driving of the PTO shaft 16 under the state where the operator is seated on the operator seat 6.

In other words, the first switch 121 is a switch used for being operated under the state where the operator is boarding on the tractor 1. The first switch 121 meanwhile is one of the operation tools 10*b* disposed on the operation base 10*a*.

The first switch 121 is capable of being switched to three positions, a neutral position (an N position, a third position) 125*a*, an ON position (a first position) 125*b*, and an OFF position (a second position) 125*c*. When the first switch 121 is at the N position 125*a*, a signal representing the N position 125*a* is inputted to the control device (controller) 124 through the output terminal 29*a*.

In addition, when the first switch 121 is at the ON position 125*b*, a signal representing the ON position 125*b* is inputted to the control device (controller) 124 through an output terminal (a first output terminal) 129*b*. When the first switch 121 is at the OFF position 125*c*, a signal representing the OFF position 125*c* is inputted to the control device (controller) 124 through the output terminal (a second output terminal) 29*c*.

When the first switch 121 is at the N position 125*a*, the control device 124 recognizes that the first switch 121 is set to the N position. When the first switch 121 is at the ON position 125*b*, the control device 124 recognizes that the driving of the PTO shaft 16 is set to be turned "on". When the first switch 121 is at the OFF position 125*c*, the control device 124 recognizes that the driving of the PTO shaft 16 is set to be turned "off".

In the embodiment, the line connecting the control device 124 to the output terminal 129*c* of the first switch 121 is branched into a plurality of branched lines. In particular, the first switch 121 includes the operation portion 121 *a*. a main body 121*b*, and a connection portion 21*c*. The operation portion 121*a* is provided for a switching operation. The main body 121*b* includes a plurality of output terminals (connectors). The connection portion 21*c* is disposed on the main body 121*b* and connects the lines L11, L12, L13, and L14.

The connection portion 21*c* includes a first connection portion 21*c*1, a second connection portion 21*c*2, a third connection portion 21*c*3, and a fourth connection portion 21*c*4. The first connection portion 21*c*1 is connected to the output terminal (a connector) 29*a*. The second connection portion 21*c*2 is connected to the output terminal (a connector) 129*b*. The third connection portion 21*c*3 is connected to the output terminal (a connector) 129*c*. The fourth connection portion 21*c*4 is connected to the output terminal (a connector) 129*c* at a position different from the connecting point of the third connection portion 21*c*3.

The first connection portion 21*c*1 is connected to the first input portion 132*a* of the control device 124 by the first line L11. The second connection portion 21*c*2 is connected to the second input portion 132*b* of the control device 124 by the second line L12.

The third connection portion 21*c*3 is connected to the third input portion 132*c* of the control device 124 by the third line L13. The fourth connection portion 21*c*4 is connected to the fourth input portion 132*d* of the control device 124 by the fourth line L14.

In this manner, when detecting a signal inputted from at least one of the plurality of lines L11, L12, L13, and L14, the control device 124 recognizes that the driving of the PTO shaft 16 is set to be turned "off".

Thus, the driving of the PTO shaft 16 can be stopped with at least one of the lines L connected to the control device 124 even when the lines L are broken due to a certain trouble, for example.

Figure 9A:
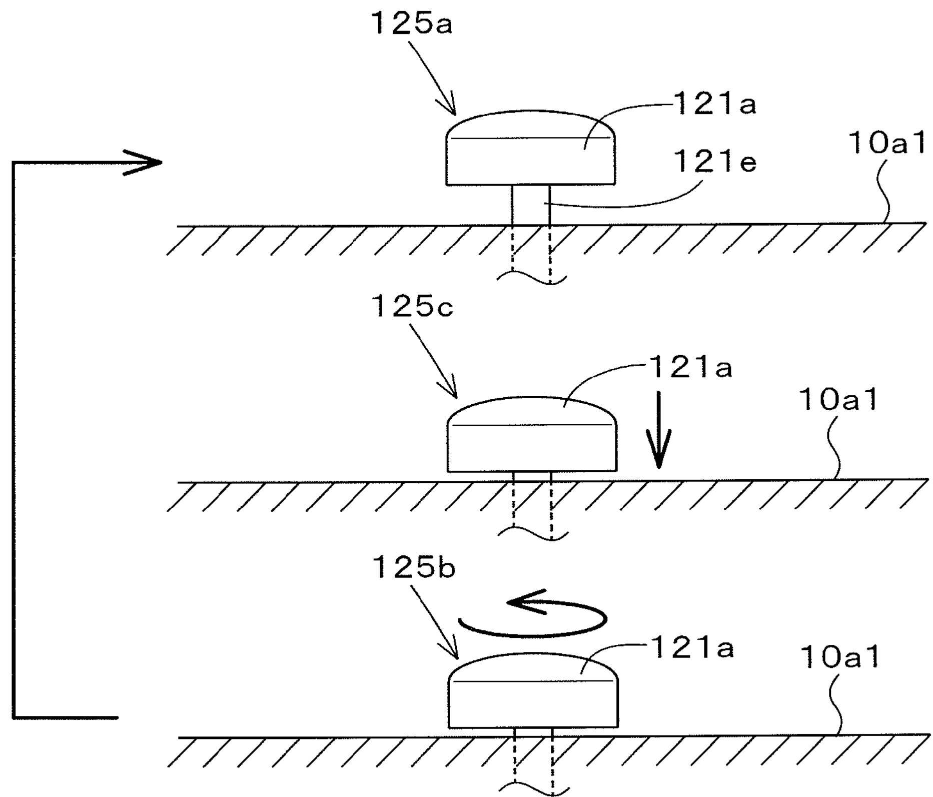
FIG. 9A is a view illustrating a motion of a first switch (an internal PTO switch) from the side according to the fifth embodiment.
Figure 9B:
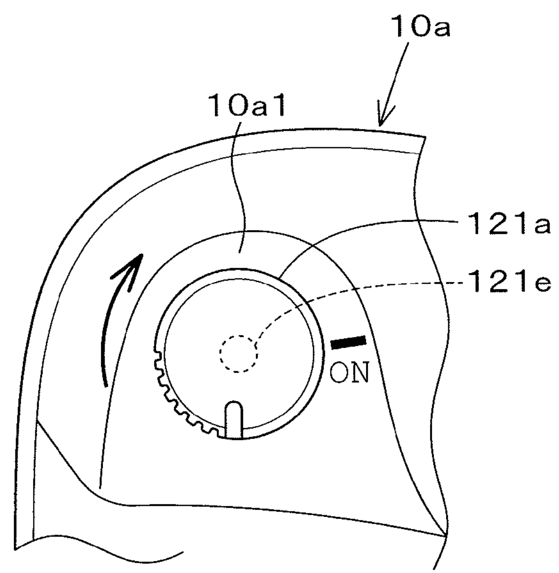
FIG. 9B is a plan view illustrating the first switch (the internal PTO switch) according to the fifth embodiment.

As shown in FIG. 9A and FIG. 9B, the first switch 121 is constituted of a switch configured to be pushed and turned. The operation portion 121*a* has a circular shape in a plan view, and is supported turnably by the support portion 121*e*.

The main body 121*b* is connected to end portion of the support portion 121*e*. For convenience of the explanation, the operation portion 121*a* will be referred to as a turn portion 121*a* below.

The N position 125*a* corresponds to an upper position at which the turn portion 121*a* of the first switch 121 separates from an upper surface 10*a*1 of the operation base 10*a*. When the turn portion 121*a* is positioned at a lower position close to the upper surface 10*a*1 of the operation base 10*a* by pushing the turn portion 21 from the upper position (the N position 125*a*), the first switch 121 is positioned at the OFF position 125*c*.

In addition, when the turn portion 121*a* is turned from the lower position (the OFF position) 125*c* to a predetermined position, the first switch 121 is positioned at the ON position 125*b*. When the turn portion 121*a* is released after the first switch 121 is positioned at the predetermined position (the ON position 125*b*), the turn portion 121*a* automatically returns to the upper position through the lower position.

That is, the first switch 121 is constituted of a momentary switch configured to automatically return from the OFF position 125*c* to the N position 125*a*.

The second switch 122 is disposed on a position different from the position of the operation portion 10, and is constituted of a switch configured to turn on and off the driving of the PTO shaft 16. In particular, the second switch 122 is constituted of a switch arranged on an upper portion of a rear wheel fender that is disposed outside the cabin 7 or arranged on an rear portion disposed outside the cabin 7.

In particular, the second switch 122 is constituted of a switch disposed in the rear portion or a side portion of the vehicle body 3. In other words, the second switch 122 is constituted of a switch to be operated by the operator got off the tractor 1, which is different from the first switch 121.

The second switch 122 is configured to be switched to be ON and OFF, thereby switching the driving of the PTO shaft 16 to be turned on and off. For example, the driving of the PTO shaft 16 is turned ON when the second switch 122 is turned on, and the driving of the PTO shaft 16 is turned off when the second switch 122 is turned OFF.

For convenience of the explanation, the first switch 121 is referred to as "an internal PTO switch 121", and the second switch 122 is referred to as "an external PTO switch 122".

The parking switch 123 is constituted of a switch configured to detect the parking of the travel vehicle body (the vehicle body) 3. As shown in FIG. 8, the parking switch 123 includes a first detection switch 123*a* and a second detection switch 123*b*.

The first detection switch 123*a* is switched to be ON when the parking lever (the parking brake) is positioned at the position (the brake position) braking the vehicle body 3, the parking lever being supported swingably by the vehicle body 3, and is switched to be OFF when the parking lever is positioned at the position (the release position) releasing the braking of the vehicle body 3.

In addition, the second detection switch 123*b* is switched to be ON when the brake device is under the braking state, the brake device being configured to brake the vehicle body 3, and is switched to be OFF when the brake device is under the state (the brake releasing state) where the brake device releases the braking. In particular, the brake device is a device configured to lock (stop) the turning of the gears disposed on the drive shaft (for example, the drive shaft transmitting a motive power to the differential device) included in the speed-change device 5.

The second detection switch 123*b* is switched to be ON under the braking state where the lock member of the brake device is latched to the gears of the drive shaft to stop the turning of the drive shaft. In addition, the second detection switch 123*b* is switched to be OFF under the braking state where the lock member of the brake device is separated from the gears of the drive shaft to allow the turning of the drive shaft.

The parking switch 123 detects the parking of the vehicle body 3 when the first detection switch 123*a* and the second detection switch 123*b* are switched to be ON. In addition, the parking switch 123 does not detect the parking of the vehicle body 3 when the first detection switch 123*a* and the second detection switch 123*b* are switched to be OFF.

The parking switch 123 is constituted of the first detection switch 123*a* and the second detection switch 123*b* in the embodiment. However, the parking switch 123 may be constituted of any one of the first detection switch 123*a* and the second detection switch 123*b*. For example, in the case where the parking switch 123 is constituted of only the first detection switch 123*a*, the parking switch 123 detects the parking of the vehicle body 3 when the first detection switch 123*a* is ON and does not detect the parking of the vehicle body 3 when the first detection switch 123*a* is OFF.

In the case where the parking switch 123 is constituted of only the second detection switch 123*b*, the parking switch 123 detects the parking of the vehicle body 3 when the second detection switch 123*b* is ON and does not detect the parking of the vehicle body 3 when the second detection switch 123*b* is OFF.

In addition, the drive device 20 for the PTO shaft includes a travel detection device 126, a seat switch 127, and an alarm device 128. The travel detection device 126, a seat switch 127, and an alarm device 128 are connected to the control device 124.

The travel detection device 126 is constituted of a detection device configured to detect the traveling (the traveling state) of the vehicle body 3 (the tractor 1). In particular, the travel detection device 126 is a vehicle speed sensor configured to measure a traveling speed of the vehicle body 3 (the tractor 1). The vehicle speed sensor 12 measures the traveling speed of the vehicle body 3 (the tractor 1) on the basis of the revolution speed of the wheels or of the drive shaft for turning the wheels.

That is, the traveling of the vehicle body 3 (the tractor 1) is not detected when the traveling speed measured by the vehicle speed sensor 126 is zero, and the traveling of the vehicle body 3 (the tractor 1) is detected when the traveling speed measured by the vehicle speed sensor 126 is more than zero.

The seat switch 127 is constituted of a switch configured to detect the operator seated on the operator seat 6. For example, the seat switch 127 is configured to be switched to be ON and OFF. The seat switch 127 is arranged in a seat of the operator seat 6 (a bottom seat, a backrest), under the seat, or the like.

When the operator is seated on the seat, the seat switch 127 is switched to be ON, and thereby detecting the seating. In addition, when the operator gets off (separates from) the seat, the seat switch 127 is switched to be OFF, and thereby not detecting the seating (detecting the not-seating).

The alarm device 128 issues an alarm in accordance with the control of the control device 124. The alarm device 128 is constituted of a speaker, a LED, a liquid crystal panel, and the like. The alarm device 128 is arranged on the operation portion 10 or around the vehicle body 3.

The control device 124 performs the control relating to the driving of the PTO shaft 16 (hereinafter referred to as a PTO control). The control device 124 drives the PTO shaft 16 or stops the driving of the PTO under the PTO control. In particular, the PTO drive portion 30 is connected to the control device 124, the PTO drive portion 30 being configured to drive the PTO shaft 16 and stop the driving.

The PTO drive portion 30 is a stopping device configured to forcibly stop the operations of the operation valve (the electromagnetic valve) 17 and/or the engine 4.

In order to stop the driving of the PTO shaft 16, the control device 124 demagnetizes the solenoid of the operation valve (the electromagnetic valve) 17, thereby operating the PTO clutch 15 in the second movement, and the control device 124 outputs a control signal to the stopping device to active the stopping device, thereby stopping the operation of the engine 4.

In addition, in order to drive the PTO shaft 16, the control device 124 magnetizes the solenoid of the operation valve (the electromagnetic valve) 17 under the state where the engine 4 is in operation, thereby operating the PTO clutch 15 in the first movement. The control device 124 issues an alarm relating to the driving of the PTO shaft 16 through the alarm device 128 under the PTO control.

Meanwhile, when the parking switch 123 is broken down, the alarm device 128 may notify the brake-down of the parking switch 123. For example, in the case where the first detection switch 123*a* is switched to be ON and the second detection switch 123*b* is switched to be ON under the state where the parking lever is positioned at the brake position, the control device 124 determines that the parking switch 123 is not broken down and the vehicle body 3 is under the parking state.

On the other hand, in the case where the second detection switch 123*b* is switched to be OFF and the first detection switch 123*a* is switched to be ON under the state where the parking lever is positioned at the brake position, the control device 124 determines that the vehicle body 3 is under the parking state but the parking switch 123 is broken down. The control device 124 outputs a breakdown notification signal to the alarm device 128 when the control device 124 determines that the parking switch 123 is broken down.

The alarm device 128 notifies the breakdown of the parking switch 123 in response to the breakdown notification signal. The alarm device 128 continues the alarm relating to the breakdown of the parking switch 123 in the case where the ignition switch or the accessory switch is switched to be ON, and stops the alarm relating to the breakdown of the parking switch 123 in the case where the ignition switch or the accessory switch is switched to be OFF.

The control device 124 executes the PTO control on the basis of the vehicle speed detected by the travel detection device (the vehicle speed sensor) 26 and the conditions of the above-mentioned various switches (the internal PTO switch 121, the external PTO switch 122, the parking switch 123, and the seat switch 127).

The control device 124 includes a first control device (a first controller) 124*a*, a second control device (a second controller) 124*b*, and a third control device (a third controller) 124*c*. The first control device 124*a*, the second control device 124*b*, and the third control device 124*c* are constituted of the electric-electronic devices constituting the control device 124, the computer programs stored in the control device 124, and the like.

In addition, the first control device 124*a*, the second control device 124*b*, and the third control device 124*c* each execute the PTO control.

The PTO control executed by the first control device 124*a*, the second control device 124*b*, and the third control device 124*c* will be explained in detail below.

The first control device 124*a* stops the driving of the PTO shaft 16 when the parking switch 123 does not detect the parking of the vehicle body 3 under the state where the PTO shaft 1 is driven in accordance with the external PTO switch 122 switched to be ON.

In particular, in the case where the operator moves the parking lever from the braking position to the releasing position under the state where the external PTO switch 122 is switched to be ON during the engine 4 is operated and the PTO shaft 16 is driven during the parking switch 123 is switched to be ON (in the case where the parking switch 123 is switched to be OFF), the first control device 124*a* demagnetizes the solenoid of the operation valve 17 to stop the driving of the PTO shaft 16.

The second control device 124*b* makes the alarm device 128 output an alarm in the case where the vehicle speed sensor 126 detects the traveling of the vehicle body 3 during the PTO shaft 16 is driven and the seat switch 127 does not detect the seating of the operator.

In particular, the second control device 124*b* outputs a signal generating the alarm (hereinafter referred to as an alarm-ordering signal) to the alarm device 128 in the case where the operator separates from the operator seat 6 to switch the seat switch 127 to be OFF during the tractor 1 travels (0<the vehicle speed detected by the vehicle speed sensor 126) from the state where the internal PTO switch 121 is switched to be ON and the seat switch 127 is switched to be ON. The alarm device 128 outputs the alarm in accordance with the signal outputted from the second control device 24, thereby calling attention to the operator.

Meanwhile, the second control device 124*b* may count an elapsed time after the seat switch 127 is switched to be OFF (a time after the operator separates from the operator seat 6), and may output the alarm-ordering signal to the alarm device 128 when the elapsed time is a predetermined time (for example, 1 second) or more.

The third control device 124*c* stops the driving of the PTO shaft 16 in the case where the vehicle speed sensor 126 does not detect the traveling of the vehicle body 3 during the PTO shaft 16 is driven and where the seat switch 127 does not detect the seating of the operator.

In particular, the third control device 124*c* demagnetizes the solenoid of the operation valve 17 to stop the driving of the PTO shaft 16 in the case where the tractor 1 stops traveling from the state where the internal PTO switch 121 is ON and the seat switch 127 is ON (0=the vehicle speed detected by the vehicle speed sensor 126) during the tractor 1 travels and where the operator separates from the operator seat 6 to switch the seat switch 127 to be OFF.

Meanwhile, the control device 124 executes a control to check (forbid) the starting of the engine 4 (hereinafter referred to as an engine-starting check). In particular, a check device 131 is connected to the control device 124, the check device 131 being configured to set the starter and the like to be OFF.

In order to execute the engine-starting check, the control device 124 makes the check device 131 not turn on the starter regardless of the ignition switch switched to be ON even when the operator turns on the ignition to try to start the engine 4, and thereby the control device 124 holds the starter to be OFF. In this manner, the engine 4 cannot be started when the engine-starting check is executed.

For example, in the case where the internal PTO switch 121 is not at the N position 125*a* at the starting of the engine 4 or in the case where the external PTO switch 122 is ON, the control device 124 executes the engine-starting check, and thereby not permitting starting the engine.

On the other hand, in the case where the internal PTO switch 121 is at the N position 125*a* at the starting of the engine 4 and in the case where the external PTO switch 122 is OFF, the control device 124 does not execute the engine-starting check, and thereby permitting starting the engine.

Figure 10:
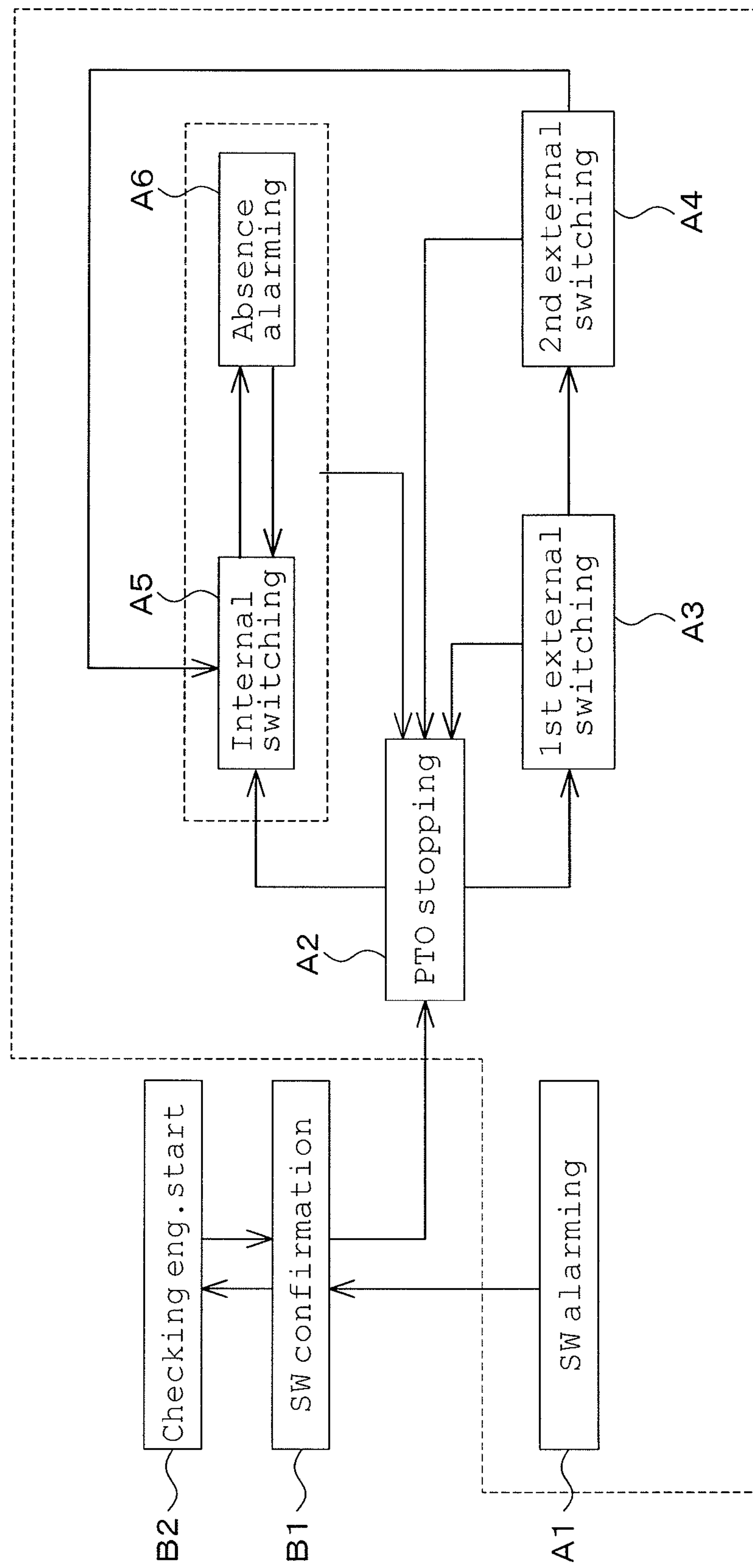
FIG. 10 is a view illustrating processes of a PTO control and an engine-starting check in blocks according to the fifth embodiment.
Figure 11:
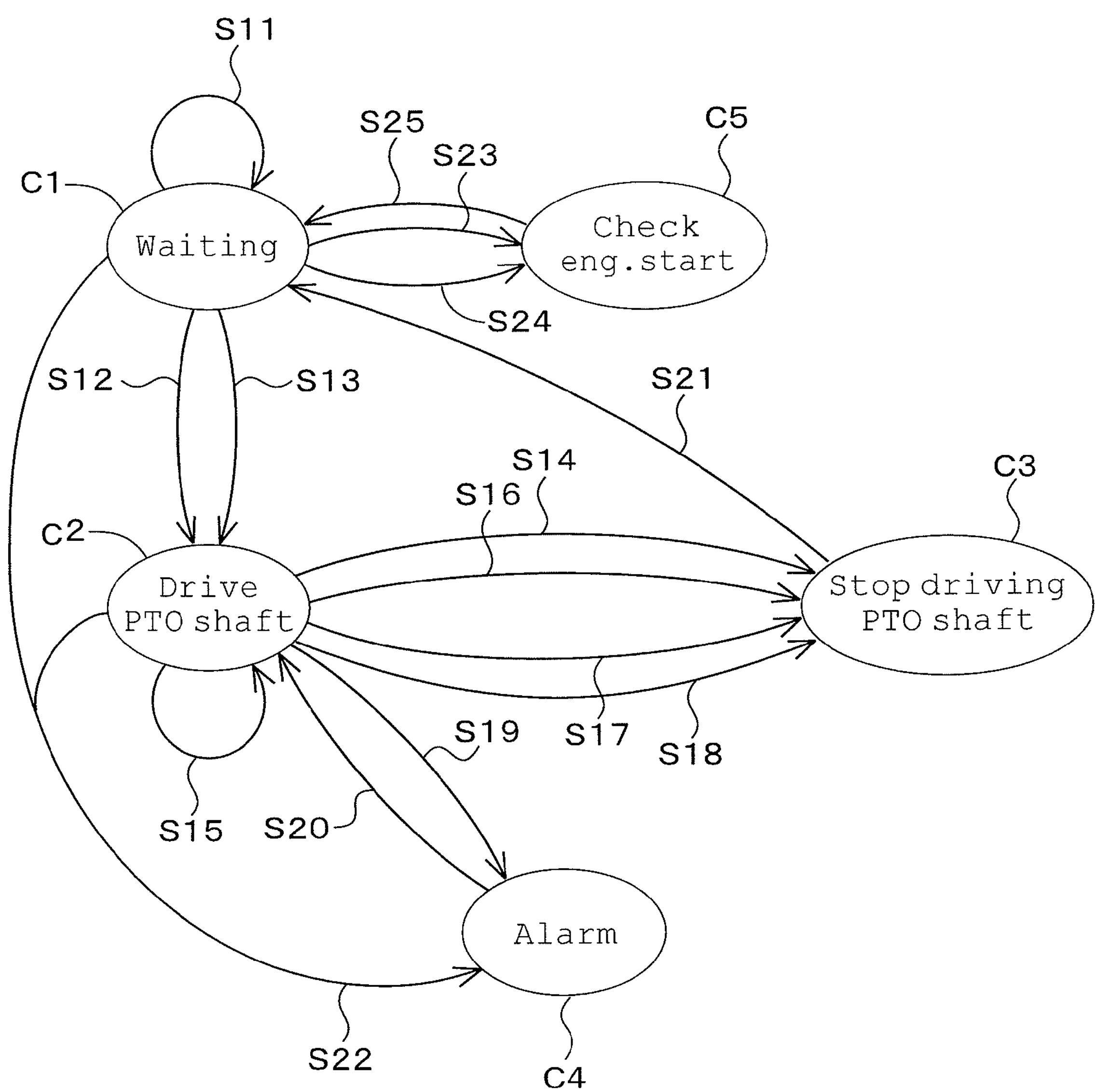
FIG. 11 is a view illustrating a phase transition relating to the PTO control and the engine-starting check according to the fifth embodiment.
Figure 12:
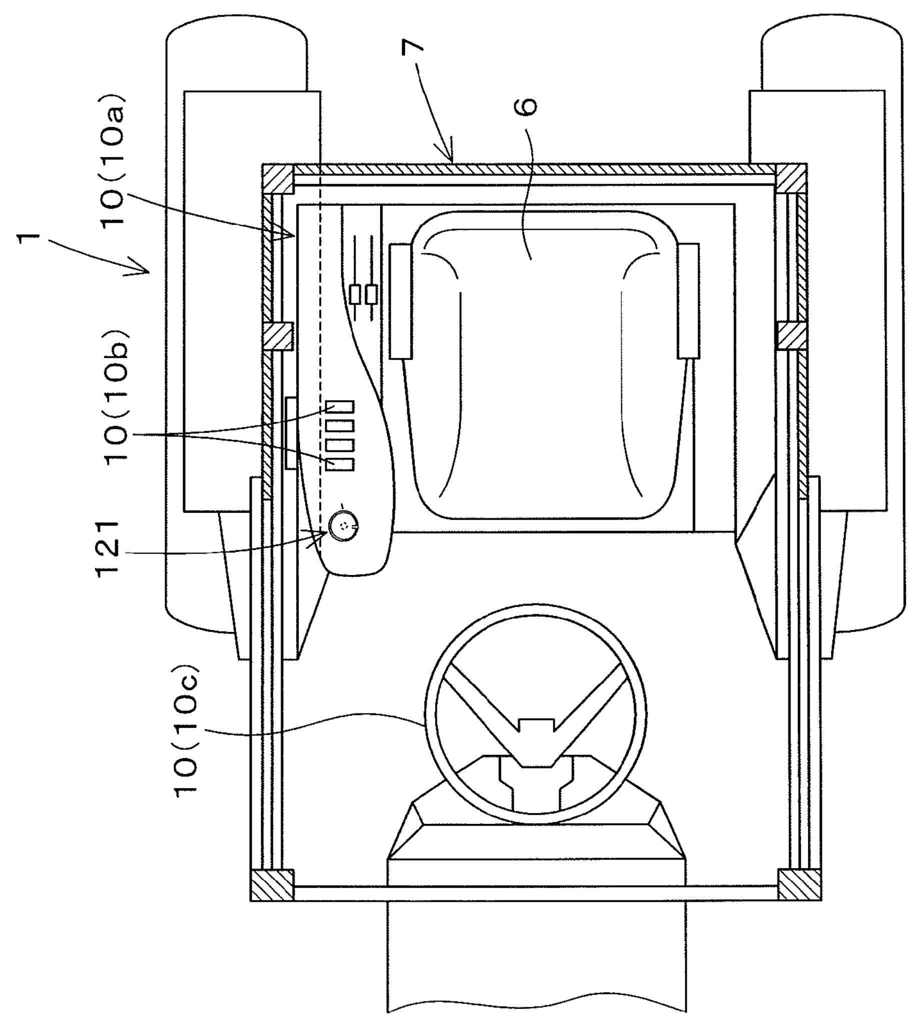
FIG. 12 is a view illustrating an inside of a cabin according to the embodiments.

FIG. 10 is a view illustrating processes of the PTO control and the engine-starting check in blocks. In addition, FIG. 11 is a view illustrating a phase transition relating to the PTO control and the engine-starting check.

Referring to FIG. 10, the process of the PTO control and the engine-starting check will be explained simply first.

As shown in FIG. 10, the process of the PTO control includes a SW alarm process A1, a PTO stopping process A2, an first external SW process A3, an second external SW process A4, an internal SW process A5, and a non-seating alarm process A6. The engine-starting check includes a SW confirmation process B1 and an engine-starting check process B2.

The SW alarm process A1 is a process executed when the internal PTO switch 121 and the external PTO switch 122 both are switched to be ON. The SW alarm process A1 is a process to output an alarm when the internal PTO switch 121 and the external PTO switch 122 both are switched to be ON.

The PTO stopping process A2 is a process to stop the driving of the PTO shaft 16 on the basis of the switch or the state of the traveling.

The first external SW process A3 is a process executed when the external PTO switch 122 is switched to be ON for a short time. The first external SW process A3 drives the PTO shaft 16 only for a time during which the external PTO switch 122 is ON.

The internal SW process A4 is a process executed when the external PTO switch 122 is switched to be ON for a long time. The internal SW process A4 holds the driving of the PTO shaft 16 at the timing when the external PTO switch 122 has been ON for a long time. The internal SW process A5 is a process executed when the internal PTO switch 121 is switched to be ON. The internal SW process A5 is a process to drive the PTO shaft 16.

The non-seating alarm process A6 is a process executed when the seat switch is switched to be OFF. The non-seating alarm process A6 is a process to output an alarm when a predetermined condition is satisfied under the condition that the seat switch 127 is OFF.

The SW confirmation process B1 is a process to confirm the states of the internal PTO switch 121 and the external PTO switch 122 before the starting of the engine 4. The engine-starting check process B2 is a process to forbids the engine to be started on the basis of the confirmation results of the internal PTO switch 121 and the external PTO switch 122 in the SW confirmation process B1.

Referring to FIG. 11, the processes and conditions of the engine-starting check and the PTO control will be explained below.

As shown in FIG. 11, the states of the drive device 20 for the PTO shaft is roughly divided into a waiting state C1, a PTO shaft driving state C2, a PTO shaft stopping state C3, an alarm state C4, and an engine-starting check state C5.

Under the waiting state C1, the control device 124 waits for the input being ON from the internal PTO switch 121 and the external PTO switch 122 (step S11). Under the waiting state C1, the drive device 20 for the PTO shaft shifts from the waiting state C1 to the PTO shaft driving state C2 when the internal PTO switch 121 is switched to be ON and the seat switch 127 is switched to be ON (step S12).

Under the PTO shaft driving state C2, the control device 124 outputs a signal representing the driving of the PTO shaft 16 (hereinafter referred to as a drive signal), that is, a signal to magnetize the solenoid of the operation valve 17 in the internal SW process A5.

In addition, under the waiting state C1, the drive device 20 for the PTO shaft shifts from the waiting state C1 to the PTO shaft driving state C2 when the external PTO switch 122 is switched to be ON and the parking switch 123 is switched to be ON (step S13).

Under the PTO shaft driving state C2, in the case where a time during which the external PTO switch 122 is switched to be ON (an elapsed time) is a predetermined time (for example, 3 seconds) or less, that is, a short time, the control device 124 outputs the drive signal to the operation valve 17 in the first external SW process A3 during the external PTO switch 122 is ON.

In addition, under the PTO shaft driving state C2, the drive device 20 for the PTO shaft shifts from the PTO shaft driving state C2 to the PTO shaft stopping state C3 when the external PTO switch 122 is switched to be OFF from ON (step S14).

Under the PTO shaft stopping state C3, the control device 124 outputs a signal representing the stopping of the driving of the PTO shaft 16 (hereinafter referred to as a drive stopping signal), that is, a signal to demagnetize the solenoid of the operation valve 17 in the PTO stopping process A2.

In addition, under the PTO shaft driving state C2, in the case where a time during which the external PTO switch 122 is switched to be ON (an elapsed time) is more than a predetermined time (for example, more than 3 seconds), that is, a long time, the control device 124 continuously outputs the drive signal to the operation valve 17 in the second external SW process A4, and thereby maintains the PTO shaft driving state C2 (step S15).

Under the PTO shaft driving state C2, in the case where any one of the internal PTO switch 22 and the external PTO switch 122 is switched to be OFF under the state where the PTO shaft 16 is driven continuously in the internal SW process A5 or the PTO shaft 16 is driven continuously in the second external SW process A4, the drive device 20 for the PTO shaft shifts from the PTO shaft driving state C2 to the PTO shaft stopping state C3 (step S16).

The control device 124 outputs the drive stopping signal to the operation valve 17 in the PTO stopping process A2. In addition, under the PTO shaft driving state C2, in the case where the parking switch 123 is switched to be OFF in the PTO shaft driving state C2 under the state where the PTO shaft 16 is continuously driven in the second external SW process A4, the drive device 20 for the PTO shaft shifts from the PTO shaft driving state C2 to the PTO shaft stopping state C3 (step S17).

The first control device 124*a* of the control device 124 outputs the drive stopping signal to the operation valve 17 in the PTO stopping process A2.

In addition, under the PTO shaft driving state C2, in the case where the vehicle speed detected by the vehicle speed sensor 126 is zero and a time during which the seat switch 127 is OFF is a predetermined time (for example, 1 second) or more under the state where the PTO shaft 16 is continuously driven in the internal SW process A5, the drive device 20 for the PTO shaft shifts from the PTO shaft driving state C2 to the PTO shaft stopping state C3 (step S18).

The third control device 124*c* of the control device 124 outputs the drive stopping signal to the operation valve 17 in the PTO stopping process A2.

In addition, under the PTO shaft driving state C2, in the case where the vehicle speed detected by the vehicle speed sensor 126 is more than zero and a time during which the seat switch 127 is OFF is 1 second or more under the state where the PTO shaft 16 is continuously driven in the internal SW process A5, the drive device 20 for the PTO shaft shifts from the PTO shaft driving state C2 to the alarm state C4 (step S19).

The second control device 124*b* of the control device 124 outputs the alarm-ordering signal to the alarm device 128 in the non-seating alarm process A6.

Under the alarm state C4, in the case where a time during which the seat switch 127 is OFF is a predetermined time (for example, 0.5 second) or less, the drive device 20 for the PTO shaft shifts from the alarm state C4 to the PTO shaft driving state C2 (step S20).

Under the PTO shaft driving state C2, the second control device 124*b* of the control device 124 outputs an alarm-releasing signal to the alarm device 128, and thereby the alarm device 128 stops the alarm.

In addition, under the PTO shaft stopping state C3, the drive device 20 for the PTO shaft shifts to the waiting state C1 when the driving of the PTO shaft 16 is stopped (step S21).

Under the waiting state C1 or the PTO shaft driving state C2, in the case where the internal PTO switch 121 and the external PTO switch 122 are both ON, the drive device 20 for the PTO shaft shifts to the alarm state C4 (step S22).

The control device 124 outputs the alarm-ordering signal to the alarm device 128 in the SW alarm process A1. The alarm device 128 notifies that both of the internal PTO switch 121 and the external PTO switch 122 are ON.

Meanwhile, under the waiting state C1, the control device 124 monitors the states of the internal PTO switch 121 and he external PTO switch 122 in the SW confirmation process B1 (hereinafter referred to as the switch monitoring). Under the state where the control device 124 executes the switch monitoring, the drive device 20 for the PTO shaft shifts from the waiting state C1 to the engine-starting check state C5 when the internal PTO switch 121 is not positioned at the N position 125*a* (S23).

In addition, under the state where the control device 124 executes the switch monitoring, the drive device 20 for the PTO shaft shifts from the waiting state C1 to the engine-starting check state C5 when the external PTO switch 122 is ON (S24).

Under the engine-starting check state C5, the control device 124 makes the check device 131 hold the starter to be OFF, and thereby the control device 124 prevents the engine 4 from being started regardless of the ignition switch switched to be ON.

Under the engine-starting check state C5, in the case where the internal PTO switch 121 is positioned at the N position 125*a* and the external PTO switch 122 is OFF, the drive device 20 for the PTO shaft shifts from the engine-starting check state C5 to the waiting state C1 (step S25).

That is, under the waiting state C1, the control device 124 permits the engine to be started by the ignition switch turned to be ON.

According to the embodiments mentioned above, the control device 124 stops the driving of the PTO shaft in the case where the parking switch 123 does not detect the parking of the parking switch 123 under the state where the PTO shaft 16 is driven in accordance with the external PTO switch 122.

As described above, the driving of the PTO shaft 16 can be stopped certainly in the case where another operator boards on the tractor 1 and then releases the parking of the tractor 1 or the parking of the tractor 1 is released because of other conditions under the state where the operator turns on the external PTO switch 122 of the tractor 1 parked already and the operator operates the working outside the tractor 1. In this manner, both of the good operability and the high safety can be provided.

The control device 124 makes the alarm device 128 output an alarm in the case where the travel detection device 126 detects the traveling during the PTO shaft 16 is driven and the seat switch 127 does not detect the seating of the operator. The control device 124 stops driving the PTO shaft 16 in the case where the travel detection device 126 does not detect the traveling during the PTO shaft 16 is driven and the seat switch 127 does not detect the seating of the operator.

In this manner, in the case where the operator is not seated on the operator seat 6 under the state where the tractor 1 travels operating the work device 2, the operator can be prompted to be seated on the operator seat 6 in the traveling of the tractor 1 and in the operation of the work device 2.

On the other hand, even in the case where the operator is not seated on the operator seat 6, the driving of the PTO shaft 16 can be automatically stopped when the travel detection device 126 detects the stopping of the tractor 1. In this manner, both of the good operability and the high safety can be provided.

In the internal PTO switch 121, the second output terminal 129*c* is connected to the control device 124 by the plurality of lines L, the second output terminal 129*c* being configured to transmit the OFF of the internal PTO switch 121. In this manner, the control device 124 can recognize the OFF of the internal PTO switch 121 with at least one of the lines L11 connected to the control device 124 even when the lines L11 are broken due to a certain trouble, for example.

That is, the configuration capable of driving the PTO shaft 16 in accordance with the internal PTO switch 121 is capable of stopping the PTO shaft 16 more certainly in accordance with the internal PTO switch 121.

The control device 124 permits the prime mover 4 such as the engine to be operated in the case where the internal PTO switch 121 is switched to the N position 125*a* and the external PTO switch 122 is switched to be OFF. In this manner, the configuration capable of driving the PTO shaft 16 in accordance with any one of the internal PTO switch 121 and the external PTO switch 122 is capable of certainly preventing the PTO shaft 16 from being driven immediately after the engine 4 is started. In this manner, both of the good operability and the high safety can be provided.

In the above description, the embodiment of the present invention has been explained. However, all the features of the embodiments disclosed in this application should be considered just as examples, and the embodiments do not restrict the present invention accordingly. A scope of the present invention is shown not in the above-described embodiments but in claims, and is intended to include all modifications within and equivalent to a scope of the claims.

What is claimed is:

1. A drive device for a PTO shaft comprising:

a parking switch to detect a parking state of a vehicle body;

a first switch arranged on an operation portion disposed on the vehicle body, the first switch being configured to be switched to enable the PTO shaft to be driven, the PTO shaft being disposed on the vehicle body;

a second switch arranged on a portion different from the operation portion, the second switch being configured to be switched to enable the PTO shaft to be driven; and a controller to drive the PTO shaft when any one of the first switch and the second switch is turned on, wherein the controller includes a first controller to stop driving the PTO shaft when the parking switch does not detect the parking state of the vehicle body under a state where the second switch is turned on to drive the PTO shaft, and wherein the first switch is configured to be switched to a first position representing an ON position where the PTO shaft is being driven, a second position representing an OFF position where the PTO shaft is being not driven, and a third position representing a neutral position where the PTO shaft is in neutral, and the controller permits operation of a prime mover when the first switch is positioned at the third position under a state where the second switch is turned off, the prime mover being disposed on the vehicle body.

* * * * *